United States Patent [19]
Bowers

[11] 3,988,668
[45] Oct. 26, 1976

[54] ANTISTATIC CAPACITANCE PROBE

[75] Inventor: Elton W. Bowers, Arlington Heights, Ill.

[73] Assignee: Robertshaw Controls Company, Richmond, Va.

[22] Filed: Oct. 17, 1975

[21] Appl. No.: 623,397

[52] U.S. Cl. .............................. 324/61 P; 73/304 C; 317/246; 340/244 C
[51] Int. Cl.² ........................................ G01R 27/26
[58] Field of Search ..................... 324/61 P, 61 R; 73/304 C; 317/246; 340/244 C, 258 C, 200

[56] References Cited
UNITED STATES PATENTS

| | | |
|---|---|---|
| 2,544,012 | 3/1951 | Edelman .......................... 324/61 P |
| 2,802,975 | 8/1957 | Weber, Jr. ........................ 324/61 P |
| 3,050,999 | 8/1962 | Edwards ........................... 324/61 P |
| 3,922,601 | 11/1975 | Martin, Jr. ..................... 324/61 P X |

*Primary Examiner*—Stanley T. Krawczewicz
*Attorney, Agent, or Firm*—Fulwider, Patton, Rieber, Lee & Utecht

[57] ABSTRACT

There is disclosed an antistatic capacitance probe including an electrically conductive gland for receipt in a port formed in the wall of a vessel for receiving a flowable material. A tubular central conductor projects axially from the gland and into the vessel and has its projecting extremity encapsulated in a dielectric insulator. An equalizer conductor wire is connected on one end to the gland and is spiral wound around the insulator throughout its length and is in electrical contact with such insulator to thus remove any static charge therefrom and conduct it into the gland, thus preventing static charge buildup on such insulator.

5 Claims, 2 Drawing Figures

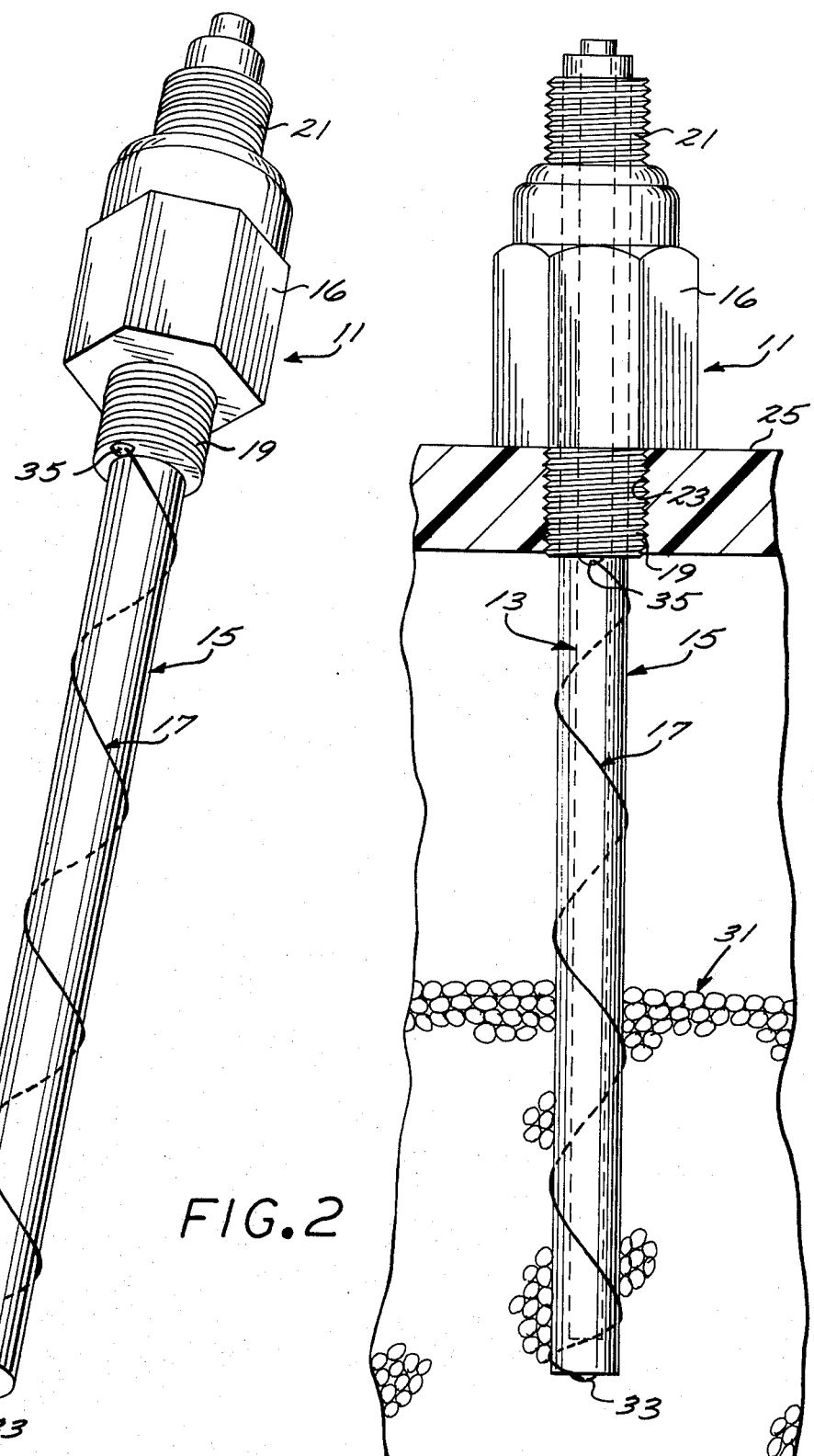

ANTISTATIC CAPACITANCE PROBE

BACKGROUND OF THE INVENTION

1. Field of the Invention

The present invention relates to capacitance probes and more particularly to capacitance probes utilized in measuring the level of substances which may build up an electrical static charge on the probe.

2. Description of the Prior Art

It has been common practice to measure the level of substances in containers by means of capacitance probes of the type that exhibit a linear change in capacitance corresponding to the level to which the substance rises on a vertically projecting probe. Such probes typically include a central conductor projecting vertically into a vessel to form one plate of a capacitor and connected to one side of a detection circuit, the second conductor or plate of the capacitor being formed by the walls of the container, or by the substance itself and being connected to the opposite side of such detection circuit.

The central conductor is normally encapsulated in an electrical insulator to thus separate such conductor from the substance itself. In the detection of the level of dry substances such as metallic or plastic pellets, the pellets themselves rub together causing a buildup thereon of an electrical static charge. Such static charge often provides a voltage high enough to break down the insulator, resulting in conduction through the probe to the detector circuit itself, resulting in destruction of various components of the detection system.

Previous efforts have led to the incorporation of protective devices such as zenor diodes in the probe circuit itself. However, zenor diodes add an uncompensated capacitance to the probe circuit, thus resulting in uncorrected error in the detection signal. Further, such zenor diodes frequently fail with the discharge of high static voltages, thus exposing the detection equipment to high static voltages and rendering it inoperative. Further, neon lamps have been proposed for protecting the detector circuit but their breakdown voltage is frequently above the threshold level which will still cause damage to the detector circuit.

SUMMARY OF THE INVENTION

The capacitance probe of the present invention is characterized by an elongated central conductor projecting from an electrically conductive gland and encapsulated in an electrical insulator. Projecting along the length of such insulator and in electrical contact therewith is an elongated equalizer conductor which conducts any static charge on such insulator therealong into the gland itself to thus prevent buildup of high destructive charges on such insulator.

The objects and advantages of the present invention will become apparent from a consideration of the following detailed description when taken in conjunction with the accompanying drawing.

DESCRIPTION OF THE DRAWING

FIG. 1 is a perspective view of an antistatic capacitance probe embodying the present invention; and FIG. 2 is a sectional view taken through the wall of a vessel in which the antistatic capacitance probe shown in FIG. 1 is mounted.

DESCRIPTION OF THE PREFERRED EMBODIMENT

The antistatic probe of the present invention includes, generally, an electrically conductive gland 11 having projecting axially therefrom and electrically insulated therefrom a central, tubular conductor 13 encapsulated within an electrical insulator 15 forming the dielectric for the resultant capacitor. Wrapped around the insulator 15 in a spiral pattern is an elongated electrically conductive equalizer wire, generally designated 17, which connects with the gland 11 to thereby receive any static charges from the insulator 15 to conduct them therealong and to the gland 11.

The gland 11 is in the form of a hex fitting 16 formed with a through central passage for projection therethrough of the central conductor 13, such conductor being electrically insulated from the gland 11. Projecting axially from the opposite ends of the hex nut 16 are externally threaded mounting and connector bosses 19 and 21, respectively. The mounting boss 19 is received in an internally threaded port 23 formed in the wall 25 of the vessel for receiving the pellets 31, of which the level is to be detected. The boss 21 has the conductor 13 projecting axially therefrom for connection with one end of an electrical connector leading from one side of a detector system (not shown) and carried in a male connector coupling.

The electrical conductor 13 is conveniently a cylindrically shaped tube and may be of any desirable electrically conductive material to form one plate of a capacitor.

The conductor tube 13 is encapsulated in a close fitting Teflon sheath forming the electrical insulator 15 to thus insulate such conductor 13 throughout its length and across its projecting end from direct electrical contact with the pellets 31 of which the level is to be measured.

The projecting end of the equalizer conductor wire 17 is anchored to the Teflon insulator 15 and then spirals along the insulator 15 in direct physical contact therewith to be welded at its opposite end 35 to the gland 11 to thus conduct electrical current directly from the surface of such insulator and into such gland.

In operation, the antistatic capacitance probe of the present invention may be installed in an internally threaded port 23 formed in the top wall 25 of a vessel to project the central conductor 13 vertically downwardly into such vessel for detection of the level of the pellets 31 received therein. A coaxial detector lead (not shown) is then connected with the nipple 21 to connect one side of the detection circuit in electrical communication with the gland 11 itself and the other side of such circuit in electrical communication with the projection of the central conductor 13 so that variations in capacitance therebetween dictated by the level to which the pellets rise on the insulator 15 are sensed and converted into a level indicator signal. As the pellets 31 are received in such vessel, rubbing thereof past one another frequently creates high electrostatic charges which are imposed on the insulator 15. However, with the equalizer wire being in direct mechanical contact with the dielectric insulator 15 throughout the length thereof and around the cylindrical periphery thereof, any static charges on such dielectric insulator 15 will be conducted directly to such equalizer wire and therealong and into the gland 11 to avoid buildup of electrical charges above the breakdown level of such dielectric insulator, thus protecting such insulator and the detection circuit against damage.

From the foregoing it will be apparent that the antistatic capacitance probe of the present invention provides an economical and reliable means for protecting a dielectric insulator of a capacitance probe from breakdown due to buildup thereon of excessive static charges to avoid consequent damage to the associated detection system. Further, equalizer conductor wire 17 provides its own ground, thus eliminating grounding problems normally associated with nonmetallic vessels such as fiberglass, PVC and lined vessels for receiving conductive materials such as acids.

Various modifications and changes may be made with regarding to the foregoing detailed description without departing from the spirit of the invention.

What is claimed is:

1. Antistatic capacitance probe for receipt in a port formed in the wall of a vessel and comprising:
    an electrically conductive gland for receipt in said port;
    a center conductor mounted on one end of said gland and projecting therefrom;
    an insulator enclosing the projecting extremity of said conductor;
    an elongated equalizing conductor connected on one end to the free extremity of said insulator and extending along the exterior of said insulator and connected on its opposite end to said gland, whereby static electrical charges imposed on said insulator along the length thereof will be conducted to said equalizer conductor and to said gland to equalize the electrostatic charge along said insulator.

2. Antistatic capacitance probe as set forth in claim 1 wherein:
    said equalizer insulator is spiraled about the axial length of said conductor and is in electrical contact therewith throughout its length.

3. Antistatic capacitance probe as set forth in claim 1 wherein:
    said central conductor is tubular shaped;
    said insulator closely fits said tubular conductor; and
    said equalizer conductor is spiral wound about said insulator and is in electrical contact therewith throughout its length.

4. Antistatic capacitance probe as set forth in claim 1 wherein:
    said central conductor is cylindrical;
    said insulator closely fits the periphery of said conductor; and
    said equalizer conductor is spiral wound about the periphery of said insulator and is in electrical contact therewith throughout its length.

5. Antistatic capacitance probe as set forth in claim 1 wherein:
    said equalizer conductor is wound about the periphery of said insulator and is in electrical contact therewith throughout its length.

* * * * *